United States Patent
Fischer et al.

(10) Patent No.: US 8,081,974 B2
(45) Date of Patent: Dec. 20, 2011

(54) METHOD AND PROCEDURES FOR PRIORITIZED TRANSMISSION ON CONTENTION CHANNELS

(75) Inventors: Patrick Fischer, Bourg la Reine (FR); Dragan Vujcic, Limours (FR); Remi Feuillette, Paris (FR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 12/447,863

(22) PCT Filed: Oct. 30, 2007

(86) PCT No.: PCT/KR2007/005385
§ 371 (c)(1),
(2), (4) Date: Apr. 29, 2009

(87) PCT Pub. No.: WO2008/054113
PCT Pub. Date: May 8, 2008

(65) Prior Publication Data
US 2010/0069037 A1  Mar. 18, 2010

Related U.S. Application Data

(60) Provisional application No. 60/863,771, filed on Oct. 31, 2006.

(51) Int. Cl.
*H04W 4/00* (2009.01)

(52) U.S. Cl. .............. 455/434; 455/435.2; 455/435.3; 455/450

(58) Field of Classification Search .............. 455/434, 455/435.1, 435.2, 435.3, 450–452.1, 464
See application file for complete search history.

(56) References Cited

U.S. PATENT DOCUMENTS

| | | | |
|---|---|---|---|
| 2005/0030919 A1* | 2/2005 | Lucidarme et al. | 370/328 |
| 2006/0154680 A1* | 7/2006 | Kroth et al. | 455/515 |
| 2006/0198347 A1 | 9/2006 | Hurtta et al. | |
| 2010/0296409 A1* | 11/2010 | Fok et al. | 370/252 |

FOREIGN PATENT DOCUMENTS

| | | |
|---|---|---|
| EP | 1524801 | 4/2005 |
| EP | 1631018 | 3/2006 |
| GB | 2406482 | 3/2005 |
| WO | 02091682 | 11/2002 |

* cited by examiner

*Primary Examiner* — Temica M Beamer
(74) *Attorney, Agent, or Firm* — Lee, Hong, Degerman, Kang & Waimey

(57) ABSTRACT

A method and mobile terminal for an improved random access prioritization scheme for Random Access Channel (RACH) transmission is provided by increasing the transmission probability based on remaining access cycles and, whereby the access delay for terminals having less remaining access cycles is decreased by increasing the transmission probability.

34 Claims, 13 Drawing Sheets

METHOD AND PROCEDURES FOR PRIORITIZED TRANSMISSION ON CONTENTION CHANNELS

CROSS REFERENCE TO RELATED APPLICATIONS

This application is the National Stage filing under 35 U.S.C. §371 of International Application No. PCT/KR2007/005385, filed Oct. 30, 2007, which claims the benefit of U.S. Provisional Application No. 60/863,771, filed Oct. 31, 2006.

TECHNICAL FIELD

The present invention is directed to an improved random access prioritization scheme for Random Access Channel (RACH) transmission based on remaining access cycles and, specifically, to decreasing the access delay for terminals having less remaining access cycles by increasing their transmission probability.

BACKGROUND ART

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the $I_{ub}$ interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the $I_{ur}$ interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the $G_f$ interface, to the MSC 6 via the $G_S$ interface, to the gateway GPRS support node (GGSN) 9 via the $G_N$ interface, and to the home subscriber server (HSS) via the $G_R$ interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the $N_B$ interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the $G_C$ interface and to the Internet via the $G_I$ interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

FIG. 3 illustrates the different logical channels that exist. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH), as well as other channels. The BCCH provides information including information utilized by a UE 1 to access a system. The PCCH is used by the UTRAN 2 to access a UE 1.

Additional traffic and control channels are introduced in the Multimedia Broadcast Multicast Service (MBMS) standard for the purposes of MBMS. The MBMS point-to-multipoint control channel (MCCH) is used for transmission of MBMS control information. The MBMS point-to-multipoint traffic channel (MTCH) is used for transmitting MBMS service data. The MBMS scheduling channel (MSCH) is used to transmit scheduling information.

The MAC layer is connected to the physical layer by transport channels. The MAC layer can be divided into a MAC-b sub-layer, a MAC-d sub-layer, a MAC-c/sh sub-layer, a MAC-hs sub-layer and a MAC-m sublayer according to the type of transport channel being managed.

The MAC-b sub-layer manages a broadcast channel (BCH), which is a transport channel handling the broadcasting of system information. The MAC-c/sh sub-layer manages a common transport channel, such as a forward access channel (FACH) or a downlink shared channel (DSCH), which is shared by a plurality of UEs 1, or in the uplink the radio access channel (RACH). The MAC-m sublayer may handle MBMS data.

FIG. 4 illustrates the possible mapping between the logical channels and the transport channels from a UE 1 perspective. FIG. 5 illustrates the possible mapping between the logical channels and the transport channels from a UTRAN 2 perspective.

The MAC-d sub-layer manages a dedicated channel (DCH), which is a dedicated transport channel for a specific UE 1. The MAC-d sublayer is located in a serving RNC 4 (SRNC) that manages a corresponding UE 1. One MAC-d sublayer also exists in each UE 1.

The RLC layer supports reliable data transmissions and performs segmentation and concatenation on a plurality of RLC service data units (SDUs) delivered from an upper layer depending of the RLC mode of operation. The RLC layer adjusts the size of each RLC SDU received from the upper layer in an appropriate manner based upon processing capacity and then creates data units by adding header information. The data units, or protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the CN 3. The BMC layer broadcasts the CB message to UEs 1 positioned in a specific cell or cells.

The PDCP layer is located above the RLC layer. The PDCP layer is used to transmit network protocol data, such as the IPv4 or IPv6, efficiently on a radio interface with a relatively small bandwidth. The PDCP layer reduces unnecessary control information used in a wired network, a function called header compression, for this purpose.

The radio resource control (RRC) layer located at the lowest portion of the third layer (L3) is only defined in the C-plane. The RRC layer controls the transport channels and the physical channels in relation to setup, reconfiguration, and the release or cancellation of the radio bearers (RBs).

A RB signifies a service provided by the second layer (L2) for data transmission between a UE 1 and the UTRAN 2. The set up of the RB generally refers to the process of stipulating the characteristics of a protocol layer and a channel required for providing a specific data service and setting the respective detailed parameters and operation methods. The RRC also handles user mobility within the RAN and additional services, such as location services.

Not all different possibilities for the mapping between the RBs and the transport channels for a given UE 1 are available all the time. The UE 1/UTRAN 2 deduce the possible mapping depending on the UE state and the procedure presently executed by the UE/UTRAN.

The different transport channels are mapped onto different physical channels. The configuration of the physical channels is given by RRC signaling exchanged between the RNC 4 and the UE 1.

Initial access is a procedure whereby a UE 1 sends a first message to the UTRAN 2 using a common uplink channel, specifically the Random Access Channel (RACH). For both GSM and UMTS systems, the initial access procedure involves the UE 1 transmitting a connection request message that includes a reason for the request and receiving a response from the UTRAN 2 indicating the allocation of radio resources for the requested reason.

There are several reasons, or establishment causes, for sending a connection request message. Table I indicates the establishment causes specified in UMTS, specifically in 3GPP TS 25.331.

TABLE I

| Establishment Causes |
| --- |
| Originating Conversational Call |
| Originating Streaming Call |
| Originating Interactive Call |
| Originating Background Call |
| Originating Subscribed traffic Call |
| Terminating Conversational Call |
| Terminating Streaming Call |
| Terminating Interactive Call |
| Terminating Background Call |
| Emergency Call |
| Inter-RAT cell re-selection |
| Inter-RAT cell change order |
| Registration |
| Detach |
| Originating High Priority Signaling |
| Originating Low Priority Signaling |
| Call re-establishment |
| Terminating High Priority Signaling |
| Terminating Low Priority Signaling |

The "originating call" establishment cause indicates that the UE 1 wants to setup a connection, for example, a speech connection. The "terminating call" establishment cause indicates that that UE 1 answers to paging. The "registration" establishment cause indicates that that the user wants to register only to the network.

A physical random access procedure is used to send information over the air. The physical random access transmission is under control of a higher layer protocol, which performs important functions related to priority and load control. This procedure differs between GSM and UMTS radio systems.

The description of GSM random access procedure can be found in "The GSM System for Mobile Communications" published by M. Mouly and M. B. Pautet, 1992. As the present invention is related to UMTS enhancement and evolution, the W-CDMA random access procedure is detailed herein. Although the present invention is explained in the context of UMTS evolution, the present invention is not so limited.

The transport channel RACH and two physical channels, Physical Random Access Channel (PRACH) and Acquisition Indication Channel (AICH), are utilized in this procedure. The transport channels are channels supplied by the physical layer to the protocol layer of the MAC layer. There are several types of transport channels to transmit data with different properties and transmission formats over the physical layer.

Physical channels are identified by code and frequency in Frequency Division Duplex (FDD) mode and are generally based on a layer configuration of radio frames and timeslots. The form of radio frames and timeslots depends on the symbol rate of the physical channel.

A radio frame is the minimum unit in the decoding process, consisting of 15 time slots. A time slot is the minimum unit in the Layer 1 bit sequence. Therefore, the number of bits that can be accommodated in one time slot depends on the physical channel.

The transport channel RACH is an uplink common channel used for transmitting control information and user data. The transport channel RACH is utilized in random access and used for low-rate data transmissions from a higher layer. The RACH is mapped to an uplink physical channel, specifically the PRACH. The AICH is a downlink common channel, which exists as a pair with PRACH used for random access control.

The transmission of PRACH is based on a slotted ALOHA approach with fast acquisition indication. The UE randomly selects an access resource and transmits a RACH preamble part of a random access procedure to the network.

A preamble is a short signal that is sent before the transmission of the RACH connection request message. The UE 1 repeatedly transmits the preamble by increasing the transmission power each time the preamble is sent until it receives the Acquisition Indicator (AI) on AICH, which indicates the detection of the preamble by the UTRAN 2. The UE 1 stops the transmission of the preamble once it receives the AI and sends the message part at the power level equal to the preamble transmission power at that point, adding an offset signaled by the UTRAN 2. FIG. 6 illustrates a power ramping procedure.

This random access procedure avoids a power ramping procedure for the entire message. A power ramping procedure would create more interference due to unsuccessfully sent messages and would be less efficient due to a larger delay since it would take much more time to decode the message before an acknowledgement could be transmitted to indicate successful receipt of the message.

The main characteristics of the RACH is that it is a contention based channel subject to collisions due to simultaneous access of several users, which may preclude decoding of the initial access message by the network. The UE 1 can start the random access transmission of both preambles and message only at the beginning of an access slot. This access method is, therefore, a type of slotted ALOHA approach with fast acquisition indication The time axis of both the RACH and the AICH is divided into time intervals or access slots. There are 15 access slots per two frames, with each frame having a length of 10 ms or 38400 chips, and the access slots are spaced 1.33 ms or 5120 chips apart. FIG. 7 illustrates the number and spacing of access slots.

The UTRAN 2 signals information regarding which access slots are available for random access transmission and the timing offsets to use between RACH and AICH, between two successive preambles and between the last preamble and the message. For example, if the AICH transmission timing is 0 and 1, it is sent three and four access slots after the last preamble access slot transmitted, respectively. FIG. 8 illustrates the timing of the preamble, AI and message part The timing at which the UE 1 can send the preamble is divided by random access sub channels. A random access sub channel is a subset including the combination of all uplink access slots. There are 12 random access sub channels. A random access sub channel consists of the access slots indicated in Table II.

TABLE II

| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

The preamble is a short signal that is sent before the transmission of the RACH message. A preamble consists of 4096 chips, which is a sequence of 256 repetitions of Hadamard codes of length 16 and scrambling codes assigned from the upper layer.

The Hadamard codes are referred to as the signature of the preamble. There are 16 different signatures and a signature is randomly selected from available signature sets on the basis of Access Service Classes (ASC) and repeated 256 times for each transmission of the preamble part. Table III lists the preamble signatures.

The message part is spread by Orthogonal Variable Spreading Factor (OVSF) codes that are uniquely defined by the preamble signature and the spreading codes for use as the preamble signature. The 10 ms long message part radio frame is divided into 15 slots, each slot consisting of 2560 chips.

Each slot includes a data part and a control part that transmits control information, such as pilot bits and TFCI. The data part and the control part are transmitted in parallel. The 20 ms long message part consists of two consecutive message part radio frames. The data part consists of 10*2k bits, where k=0, 1, 2, 3, which corresponds to a Spreading Factor (SF) of 256, 128, 64, 32. FIG. 9 illustrates the structure of the random access message part.

TABLE III

| Preamble signature | Value of n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | -1 | -1 | -1 | -1 | 1 | 1 | -1 | -1 | 1 | 1 | 1 | 1 | -1 | -1 |
| $P_{15}(n)$ | 1 | -1 | -1 | 1 | -1 | 1 | 1 | -1 | -1 | 1 | 1 | -1 | 1 | -1 | -1 | 1 |

The AICH consists of a repeated sequence of 15 consecutive access slots, each slot having a length of 40 bit intervals or 5120 chips. Each access slot includes two parts, an Acquisition Indicator (AI) part consisting of 32 real-valued signals, such as a0 . . . a31, and a part having a length of 1024 chips during which transmission is switched off. FIG. 10 illustrates the structure of the AICH.

When the UTRAN 2 detects transmission of a RACH preamble having a certain signature in an RACH access slot, the UTRAN repeats this signature in the associated AICH access slot. Therefore, the Hadamard code used as the signature for the RACH preamble is modulated onto the AI part of the AICH.

The acquisition indicator corresponding to a signature can have a value of +1, -1 or 0 depending on whether a positive acknowledgement (ACK), a negative acknowledgement (NACK) or no acknowledgement is received in response to a specific signature. The positive polarity of the signature indicates that the preamble has been acquired and the message can be sent.

The negative polarity indicates that the preamble has been acquired and the power ramping procedure shall be stopped, but the message shall not be sent. This negative acknowledgement is used when a received preamble cannot be processed at the present time due to congestion in the UTRAN 2 and the UE 1 must repeat the access attempt some time later.

All UEs 1 are members of one of ten randomly allocated mobile populations, defined as Access Classes (AC) 0 to 9. The population number is stored in the Subscriber Identity Module (SIM)/Universal Subscriber Identity Module (USIM). UEs 1 may also be members of one or more out of 5 special categories of Access Classes 11 to 15, which are allocated to specific high priority users and the information also stored in the SIM/USIM. Table IV lists the special AC and their allocation.

TABLE IV

| AC | Allocation |
|---|---|
| 15 | PLMN Staff |
| 14 | Emergency Services |
| 13 | Public Utilities (e.g. water/gas suppliers) |
| 12 | Security Services |
| 11 | |

The UTRAN 2 performs the random access procedure at protocol layer L2 by determining whether to permit the UE 1 to use a radio access resource based primarily upon the AC to which the UE belongs.

It will be desirable to prevent UE 1 users from making access attempts, including emergency call attempts, or responding to pages in specified areas of a Public Land Mobile Network (PLMN) under certain circumstances. Such situations may arise during states of emergency or where 1 or more co-located PLMNs has failed. Broadcast messages should be available on a cell-by-cell basis to indicate the class(es) of subscribers barred from network access. The use of this facility allows the network operator to prevent overload of the access channel under critical conditions Access attempts are allowed if the UE 1 is a member of at least one AC that corresponds to the permitted classes as signaled over the air interface and the AC is applicable in the serving UTRAN 2. Access attempts are otherwise not allowed. Any number of these AC may be barred at any one time. Access Classes are applicable as indicated in Table V.

TABLE V

| AC | Applicability |
|---|---|
| 0-9 | Home and Visited PLMNs |
| 11 and 15 | Home PLMN only |
| 12, 13, 14 | Home PLMN and visited PLMNs of home country only |

An additional control bit for AC 10 is also signaled over the air interface to the UE 1. This control bit indicates whether access to the UTRAN 2 is allowed for Emergency Calls for UEs 1 with access classes 0 to 9 or without an International Mobile Subscriber Identity (IMSI). Emergency calls are not allowed if both AC 10 and the relevant AC, 11 to 15 are barred for UEs 1 with access classes 11 to 15. Emergency calls are otherwise allowed.

The AC are mapped to ASC In the UMTS. There are eight different priority levels defined, specifically ASC 0 to ASC 7, with level 0 representing the highest priority.

Access Classes shall only be applied at initial access, such as when sending an RRC Connection Request message. A mapping between AC and ASC shall be indicated by the information element "AC-to-ASC mapping" in System Information Block type 5. The correspondence between AC and ASC is indicated in Table VI.

TABLE VI

| AC | 0-9 | 10 | 11 | 12 | 13 | 14 | 15 |
|---|---|---|---|---|---|---|---|
| ASC | 1$^{st}$ IE | 2$^{nd}$ IE | 3$^{rd}$ IE | 4$^{th}$ IE | 5$^{th}$ IE | 6$^{th}$ IE | 7$^{th}$ IE |

In Table VI, "nth IE" designates an ASC number i in the range 0-7 to AC. The UE 1 behavior is unspecified if the ASC indicated by the "nth IE" is undefined.

The parameters implied by the respective ASC are utilized for random access. A UE 1 that is a member of several ACs selects the ASC for the highest AC number. The AC is not applied in connected mode.

An ASC consists of a subset of RACH preamble signatures and access slots that are allowed for the present access attempt and a persistence value corresponding to a probability, $Pv \leq 1$, to attempt a transmission. Another important mechanism to control random access transmission is a load control mechanism that reduces the load of incoming traffic when the collision probability is high or when the radio resources are low. A flow chart of the control access procedure is illustrated in FIG. 11.

Existing specifications provide many RACH transmission control parameters that are stored and updated by the UE 1 based on system information broadcast by the UTRAN 2. These parameters are received from RRC (S10). The RACH transmission control parameters include PRACH, ASC, maximum number of preamble ramping cycles ($M_{max}$), range of backoff interval for timer ($T_{BO1}$) specified as a number of 10 ms transmission time intervals ($N_{BO1max}$) and ($N_{BO1min}$) and applicable when NACK is received on AICH.

When it is determined that there is data to transmit (S20), the UE 1 maps the assigned AC to an ASC (S30). A count value M is then set to zero (S40).

The count value M is then incremented by one (S50). The UE 1 determines if the count value M, which represents the maximum number of RACH transmission attempts, exceeds the maximum number of permitted RACH transmission attempts $M_{max}$ (S60).

The UE 1 treats the transmission as unsuccessful if M exceeds $M_{max}$. The UE 1 then indicates the unsuccessful transmission to a higher layer (S70)

However, the UE 1 proceeds with the RACH access procedure if M is less than or equal to $M_{max}$. The UE 1 updates the RACH transmission control parameters (S80). A 10 ms timer $T_2$ is set (S90) and the UE 1 determines whether to attempt transmission based on the persistence value $P_i$ associated with the ASC selected by the UE.

Specifically, a random number between 0 and 1, R, is generated (S100) and the random number is compared to the persistence value (S110). The UE 1 does not attempt transmission if $R_i$ is less than or equal to the persistence value $P_i$ and waits until the 10 ms timer $T_2$ expires (S120) before repeating the RACH access procedure by updating the RACH transmission control parameters (S80). However, the UE 1 attempts to transmit using assigned RACH resources (S130) if $R_i$ is less than or equal to the persistence value $P_i$.

The UE 1 determines whether the response from the network is an Acknowledgement (ACK), a Non-Acknowledgment (NACK) or no response (S150) after the access attempt is transmitted. The UE 1 begins message transmission (S160) if an ACK is received, thereby indicating receipt of the UE transmission by the UTRAN 2. The UE 1 does not transmit the message and repeats the RACH access procedure by incrementing the count value M (S50) if no response is received or a NACK is received, thereby indicating a failed receipt of the transmission by the network, for example, due to a collision.

The UE 1 only waits until the 10 ms timer $T_2$ expires (S170) before repeating the RACH access procedure if no response was received. However, the UE 1 waits until the 10 ms timer $T_2$ expires (S180) and also randomly generates a back off value $N_{BO1}$ associated with the PRACH assigned to the UE and between $N_{BO1max}$ and $N_{BO1min}$ and waits an additional back off interval $T_{BO1}$ that is equal to 10 ms multiplied by the back off value $N_{BO1}$ (S190) before repeating the RACH access procedure if a NACK was received.

The physical layer (L1) random access procedure is initiated upon request from the MAC sub layer (L2). The physical layer receives information from a higher layer, specifically the RRC, before the physical random-access procedure is initiated and receives information from a higher layer, specifically the MAC, at each initiation of the physical random access procedure. The information is indicated in Table VII. The physical layer random-access procedure is illustrated in FIG. 12.

As illustrated in FIG. 12, one access slot in the random access subchannel that can be used for the given ASC is randomly selected from access slots that can be used in the next full access slot sets (S200). One access slot is randomly chosen from access slots that can be used in the next full access slot sets if there are no access slots available. One signature is then randomly selected from the set of available signatures within the given ASC (S210).

The preamble retransmission counter is set at Preamble Retrans Max (S220), which is the maximum number of preamble retransmission attempts. The preamble transmission power is set at Preamble Initial Power (S230), which is the initial transmission power of the preamble. The preamble is then transmitted according to the chosen uplink access slot, signature and set transmission power (S240).

The UE 1 then determines whether the UTRAN 2 detected the preamble (S250). No random access message is transmitted if a NACK is detected in the downlink access slot corresponding to the selected uplink access slot. A random access message is transmitted if an ACK is detected in the downlink access slot corresponding to the selected uplink access slot. The preamble is retransmitted if no response, specifically neither an ACK nor a NACK for the selected signature, is detected in the downlink access slot corresponding to the selected uplink access slot.

When no response is received, the next available access slot is selected from the random access subchannel within the given ASC (S260), a new signature is randomly selected from the available signatures within the given ASC (S270), the preamble transmission power is increased by the step width of the power ramping (Power Ramp Step) (S280) and the preamble retransmission counter is reduced by 1 (S290). The UE 1 then determines if the maximum number of retransmissions have been attempted (S300). This preamble re-transmission procedure is repeated for as long as the preamble retransmission counter exceeds 0 and no response is received. The MAC is informed that no ACK was received on AICH (S310) and the physical layer random access procedure is terminated once the retransmission counter reaches 0.

TABLE VII

Information Related to Physical Random-Access Procedure

| Before Initiation of Procedure | Upon Initiating Procedure |
| --- | --- |
| Preamble scrambling code. | Transport Format for PRACH message part. |
| Message length in time (10 or 20 ms) | ASC of the PRACH transmission |
| AICH_Transmission_Timing parameter (0 or 1) | Data to be transmitted (Transport Block Set) |
| Set of available signatures and set of available RACH sub-channels for each Access Service Class (ASC). | |
| Power-ramping factor Power Ramp Step (integer > 0) | |
| Preamble Retrans Max parameter (integer > 0) | |
| Initial preamble power (Preamble_Initial_Power) | |
| Power offset in dB between power of the last transmitted preamble and power of the control part of the random-access message ($P_{p-m} = P_{message-control} - P_{preamble}$ measured) | |
| Set of Transport Format parameters (including power offset between the data part and the control part of the random-access message for each Transport Format) | |

If an ACK is received, the transmission power of the control channel of the random access message is set at a level higher than the transmission power of the last preamble transmitted according to a power offset (S320) and the random access message is transmitted 3 or 4 uplink access slots after the uplink access slot of the last transmitted preamble depending on the AICH transmission timing parameter (S330). The higher layer is then informed of the receipt of the ACK and transmission of the random access message (S340) and the physical layer random access procedure is terminated.

If a NACK is received, no random access message is transmitted and no re-transmission of the preamble is performed. The MAC is informed that a NACK was received (S350) and the physical layer random access procedure is terminated.

FIG. 13 illustrates a signaling establishment procedure between a UE 1 and UTRAN 2. As illustrated in FIG. 13, the RRC Connection Request message is transmitted once the PRACH power control preambles have been acknowledged (S400). The RRC Connection Request message includes a reason for requesting the connection.

The UTRAN 2 determines which resources to reserve and performs synchronization and signaling establishment among radio network nodes, such as a NodeB 5 and serving RNC 4, depending on the request reason (S410). The UTRAN 2 then transmits the Connection Setup message to the UE 1, thereby conveying information about radio resource to use (S420).

The UE 1 confirms connection establishment by sending the Connection Setup Complete message to the UTRAN 2 (S430). The UE 1 transmits the Initial Direct Transfer message to the UTRAN 2 once the connection has been established (S440). The Initial Direct Transfer message includes information such as the UE identity, UE current location and the kind of transaction requested.

Authentication is then performed between the UE 1 and UTRAN 2 and security mode communication is established (S450). The actual set up information is delivered to the UTRAN 2 from the UE 1 via the Call Control Setup message (S460). The Call Control Setup message identifies the transaction and indicates the QoS requirements.

The UTRAN 2 initiates activities for radio bearer allocation by determining if there are sufficient resources available to satisfy the requested QoS and transmits the Call Control Complete message to the UE 1 (S470). The radio bearer is allocated according to the request if there are sufficient resources available. The UTRAN 2 may select either to continue allocation with a lowered QoS value, queue the request until sufficient radio resources become available or reject the call request if sufficient resources are not presently available.

As disclosed, a maximum number of access attempt cycles is defined in a conventional RACH transmission process. A UE 1 performs another access cycle if either no acknowledgment (ACK) message is received or a no acknowledgement (NACK) message is received as long as the maximum number of allowed access cycles is not exceeded.

The transmission probability for each access cycle is based on a persistence value (Pi) and a UE 1 decides whether to start the physical layer RACH transmission procedure in the present transmission time interval based on the persistency value. The RACH transmission procedure is initiated if transmission is allowed. A new persistency check is performed in the next transmission time interval if transmission is not allowed.

The persistency check is repeated until transmission is permitted. The persistence values Pi may be associated with each ASC. The persistency value is set or updated by the network and is unchangeable for any allowable access cycles in conventional wireless systems.

Therefore, any UEs within the same ASC have the same transmission probability regardless the remaining access cycles. A bad user experience may result for UEs 1 that re-attempt access to the UTRAN 2 since their access delay is negatively impacted.

DISCLOSURE OF THE INVENTION

Technical Problem

One disadvantage of conventional access procedures is a short average access time, but worst-case delay for when access is high. Another disadvantage of conventional access procedures is the fairness of transmission probability and average QoS. For example two UEs 1 within the same ASC have the same transmission probability although one UE is attempting to perform the last access cycle while another UE is attempting to perform the first access cycle.

Technical Solution

In one aspect of the present invention, a method of establishing a communication link between a mobile terminal and a network is provided. The method includes determining that access to the network is required and successively transmitting an access request to the network until access is granted or a predetermined criteria occurs, wherein the time at which each access request is transmitted is dependent upon a process that creates a random delay, the random delay process altered for each access request subsequent to transmission of the first access request such that the probability of a smaller random delay is increased.

It is contemplated that the predetermined criteria is reached when a maximum number of access requests is transmitted. It is further contemplated that the method includes comparing a first value to a second value.

It is contemplated that comparing the first value to the second value comprises assigning an initial first value to the mobile terminal and randomly generating the second value. It is further contemplated that the assigned value is changed by a greater amount before each subsequent access request.

It is contemplated that the comparison process is altered such that the range of possible randomly generated second numbers is restricted. It is further contemplated that either an upper limit of the range is decreased or a lower limit of the range is increased before each subsequent access request.

It is contemplated that the delay process is altered such that the first value is either increased or decreased. It is further contemplated that the access request is transmitted if the second value is not greater than the first value.

It is contemplated that the comparison process is altered such that the first value is decreased. It is further contemplated that the comparison process is altered such that the range of randomly generated second numbers is restricted to a range having an upper limit.

It is contemplated that the upper limit is decreased by a greater amount before each subsequent access request. It is further contemplated that the first value is decreased by a greater amount before each subsequent access request.

It is contemplated that the method includes altering the comparison process according to a priority class of the mobile terminal. It is further contemplated that the priority class is related to an access class of the mobile terminal.

It is contemplated that the priority class is related to a reason for accessing the network. It is further contemplated that the method includes altering the comparison process such that transmission is guaranteed for the mobile terminal if the next subsequent transmission of an access request will result in the criteria occurring.

In another aspect of the present invention, a mobile terminal for establishing a communication link between a mobile terminal and a network is provided. The mobile terminal includes a transmitting/receiving unit transmitting an access request to the network, a display unit displaying user interface information, an input unit receiving inputs from a user and a processing unit controlling the transmitting/receiving unit to successively transmit an access request to the network until access is granted or a predetermined criteria occurs, wherein the processing unit identifies a time at which each access request is transmitted by determining a random delay, the process for determining the random delay altered for each access request subsequent to transmission of the first access request such that the probability of a smaller random delay is increased.

It is contemplated that the predetermined criteria is reached when a maximum number of access requests is transmitted. It is further contemplated that the processing unit identifies the time at which each access request is transmitted by comparing a first value to a second value.

It is contemplated that the processing unit compares the first value to the second value by assigning an initial first value to the mobile terminal and randomly generating the second value. It is further contemplated that the processing unit changes the assigned value by a greater amount before each subsequent access request.

It is contemplated that the processing unit alters the comparison such that the range of possible randomly generated second numbers is restricted. It is further contemplated that the processing unit either decreases an upper limit of the range or increases a lower limit of the range before each subsequent access request.

It is contemplated that the processing unit alters the process for determining the random delay such that the first value is either increased or decreased. It is further contemplated that the control unit controls the transmitting/receiving unit to transmit the access request if the second value is not greater than the first value.

It is contemplated that the processing unit alters the comparison process such that the first value is decreased. It is further contemplated that the processing unit alters the comparison process such that the range of randomly generated second numbers is restricted to a range having an upper limit.

It is contemplated that the processing unit decreases the upper limit by a greater amount before each subsequent access request. It is further contemplated that the processing unit decreases the first value by a greater amount before each subsequent access request.

It is contemplated that the processing unit alters the comparison process according to a priority class of the mobile terminal. It is further contemplated that the priority class is related to an access class of the mobile terminal.

It is contemplated that the priority class is related to a reason for accessing the network. It is further contemplated that the processing unit alters the comparison process such that transmission is guaranteed for the mobile terminal if the next subsequent transmission of an access request will result in the criteria occurring.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

BEST MODE FOR CARRYING OUT THE INVENTION

The present invention proposes an improved random access prioritization scheme for RACH transmission by increasing the UE 1 transmission probability based on remaining access cycles. Specifically, the present invention proposes to decrease the access delay for UEs 1 having less remaining access cycles by increasing their transmission probability.

According to the present invention, the initial persistence value $P_i$ is set in the same manner as in the conventional process and used to perform the first access cycle. However, $P_i$ is increased as a function of maximum allowable access cycles $M_{max}$ and ongoing access cycle $M_{current}$ for subsequent access cycles. It should be noted that even if the UTRAN 2 may update the $P_i$ value based on traffic load as in the conventional process, the updated value shall also be increased as a function of $M_{max}$ and $M_{current}$.

According to the invention, the RACH transmission probability, based on the persistence value $P_i$ is increased for each access cycle. The persistence probability value $P_i$ controls the timing of RACH transmissions. A UE 1 determines a number, R, randomly between 0 and 1 when initiating RACH transmission after receiving the necessary system information, such as the maximum number of access cycles and establishing the relevant $P_i$.

The physical layer PRACH transmission procedure is initiated if $R \leq P_i$. The transmission is deferred according to a timeout time if $R > P_i$, with no timeout or a timeout time of 0 not excluded from consideration, and a new random number is determined. The deferral and new random number determination is repeated until $R \leq P_i$ and the physical layer PRACH transmission procedure is initiated.

A backoff is performed once the transmission procedure is initiated if a NACK is received indicating that no resources are available or no ACK has been received and a random access timeout has occurred. The UE 1 must wait for a backoff timer to expire before it is allowed to perform another access cycle, with a backoff timer value of 0 not excluded from consideration.

The UE 1 must then update the value of $P_i$ if required by the UTRAN 2, for example, due to traffic load to control uplink interference, and increase the value of $P_i$ based on the current access cycles $M_{current}$ and the maximum allowable access cycles $M_{max}$. The UE 1 then performs another persistence check to determine if the PRACH transmission procedure can be initiated in the present transmission time interval. The following equations are used to determine the value of $P_i$:

$$0 \leq M_{current} < M_{max}$$

Transmission probability $P_i = P_i$, if $M_{current} < 1$

Transmission probability $P_i = f(M_{max}, M_{current})$, if $M_{current} > 1$

Figure 1:
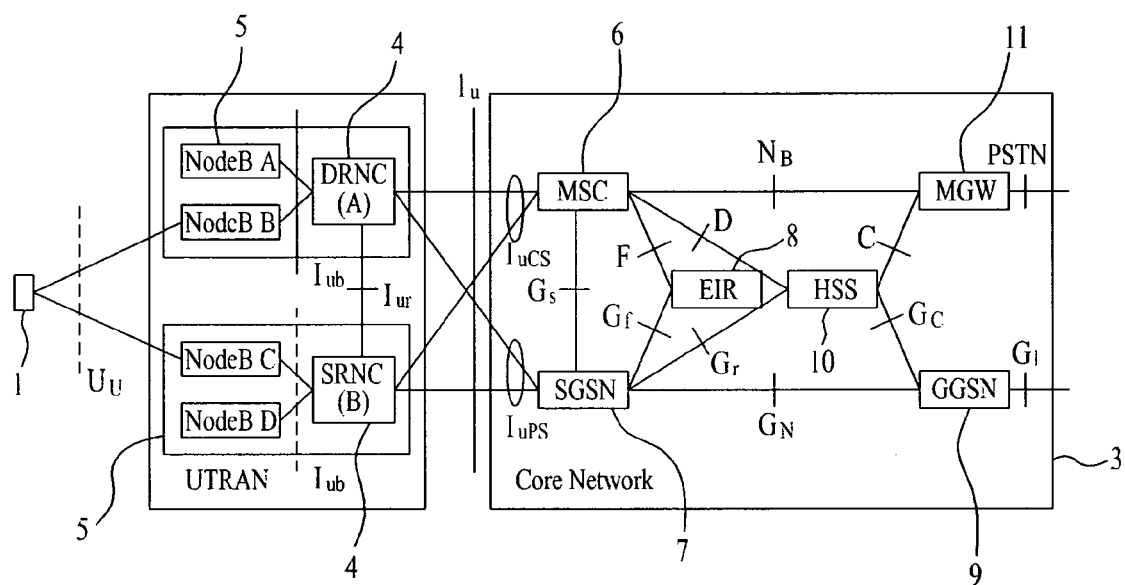
FIG. 1 illustrates an overview of a UMTS network.
Figure 2:
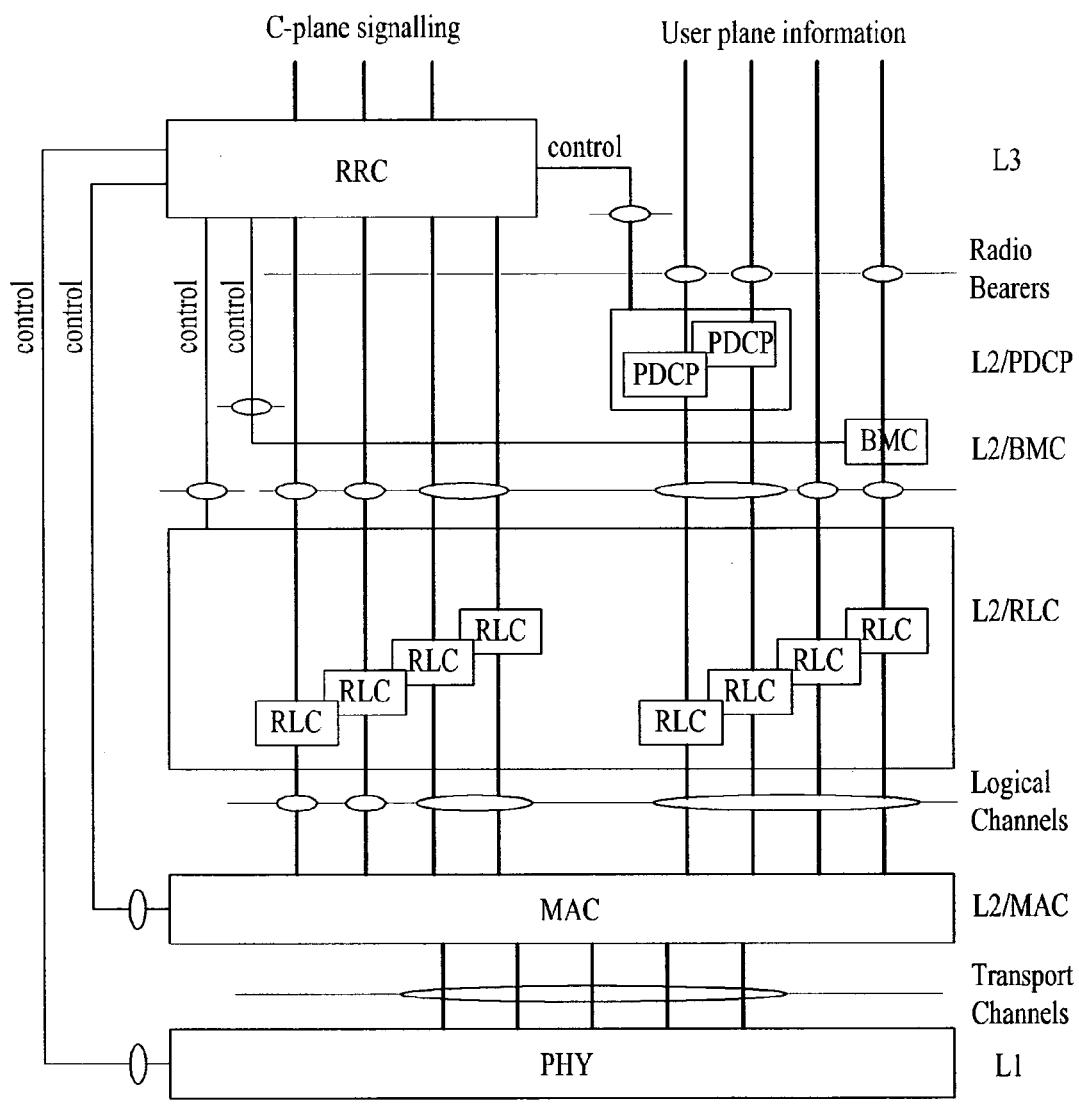
FIG. 2 illustrates a structure of a radio interface protocol between a UE and the UTRAN according to the 3GPP radio access network standards.
Figure 3:
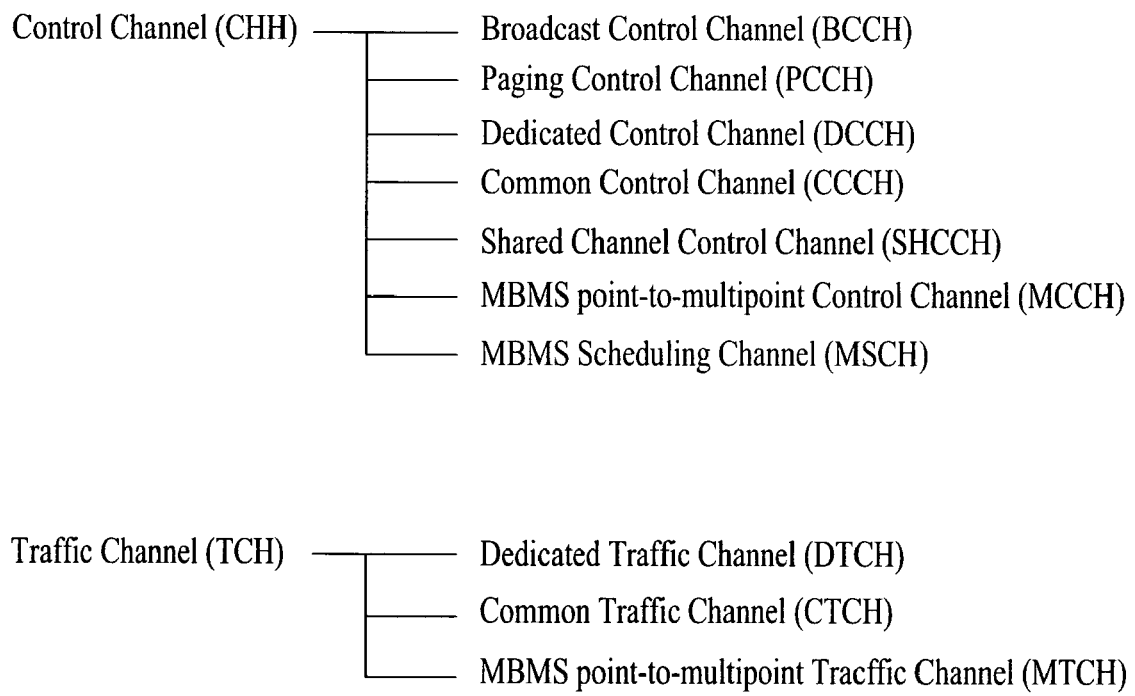
FIG. 3 illustrates the different logical channels.
Figure 4:
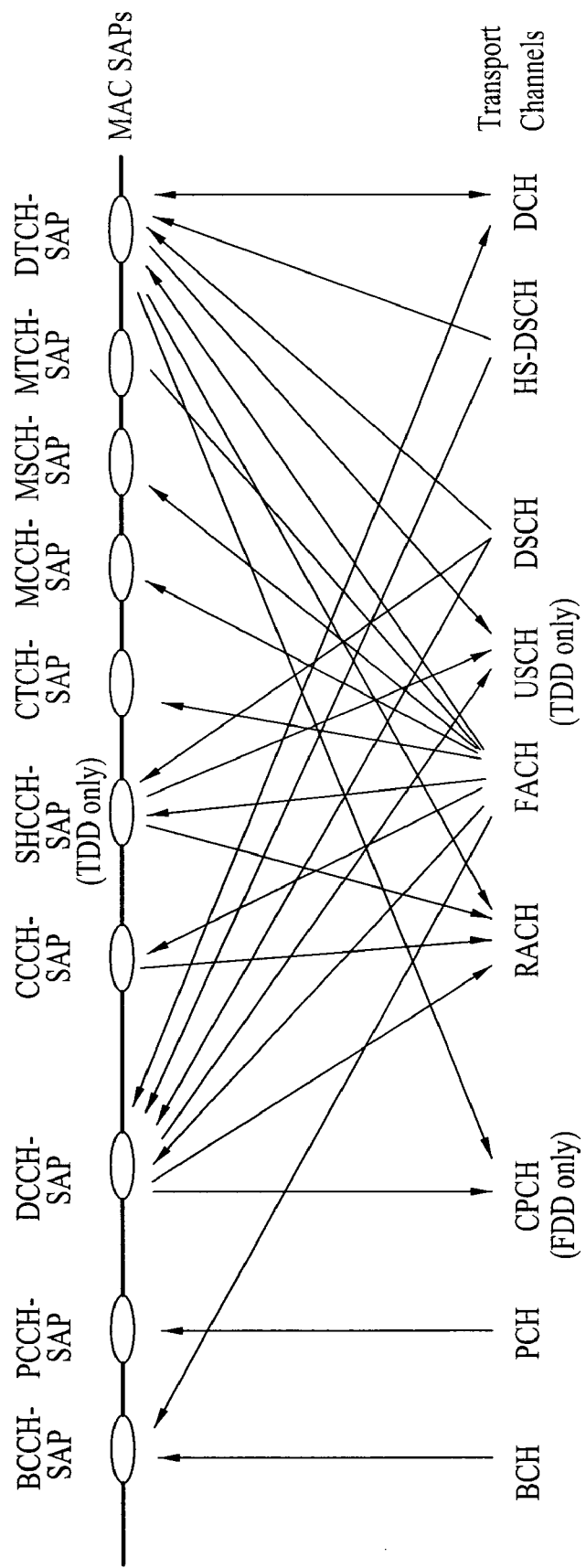
FIG. 4 illustrates logical channels mapped onto transport channels as seen from the UE side.
Figure 5:
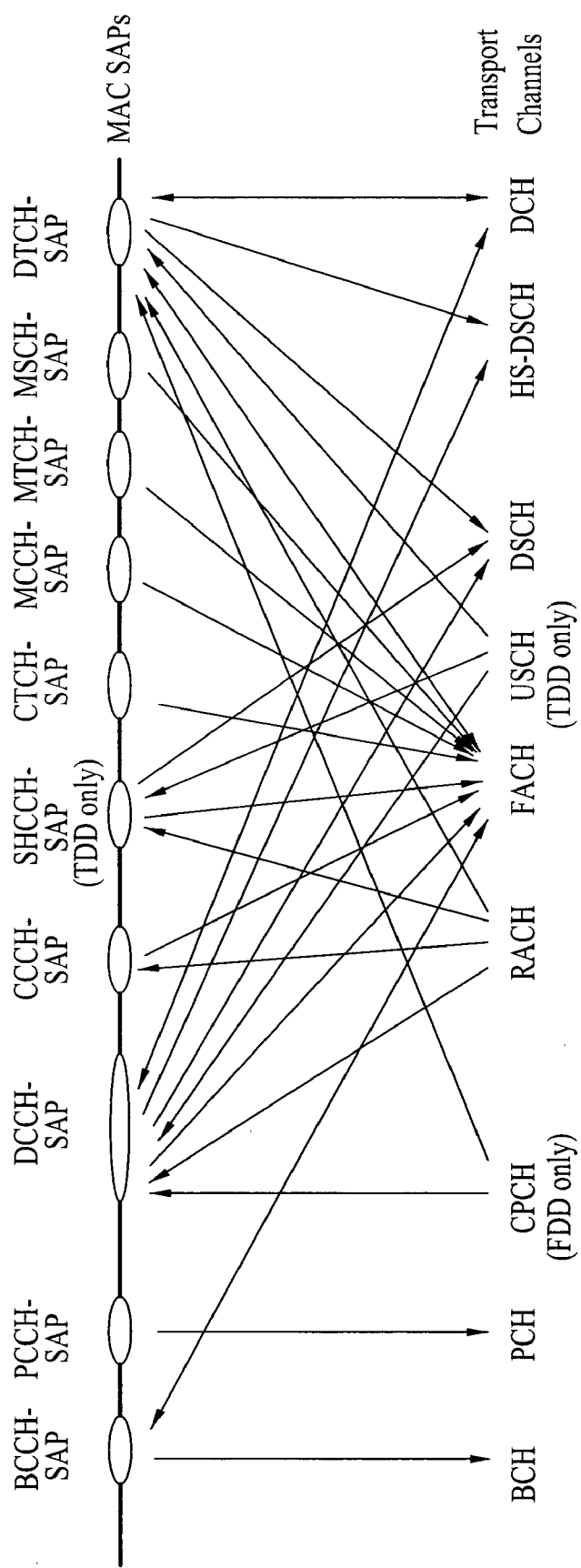
FIG. 5 illustrates logical channels mapped onto transport channels as seen from the UTRAN side.
Figure 6:
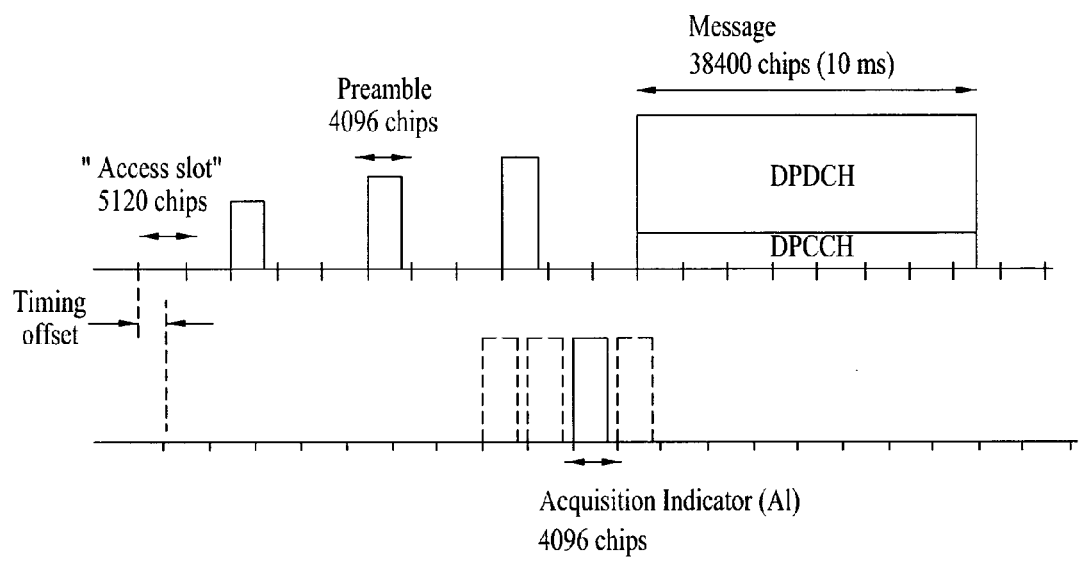
FIG. 6 illustrates a power ramping procedure.
Figure 7:
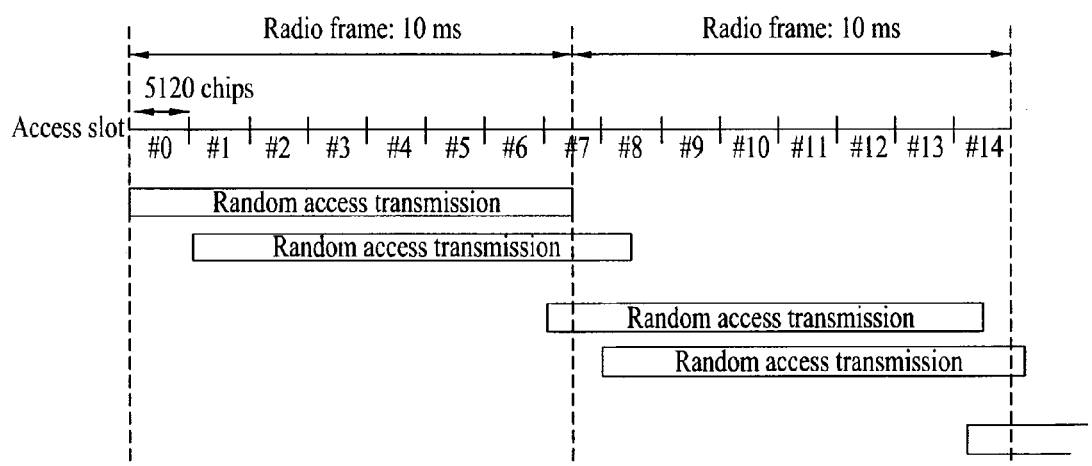
FIG. 7 illustrates the number and spacing of access slots.
Figure 8:
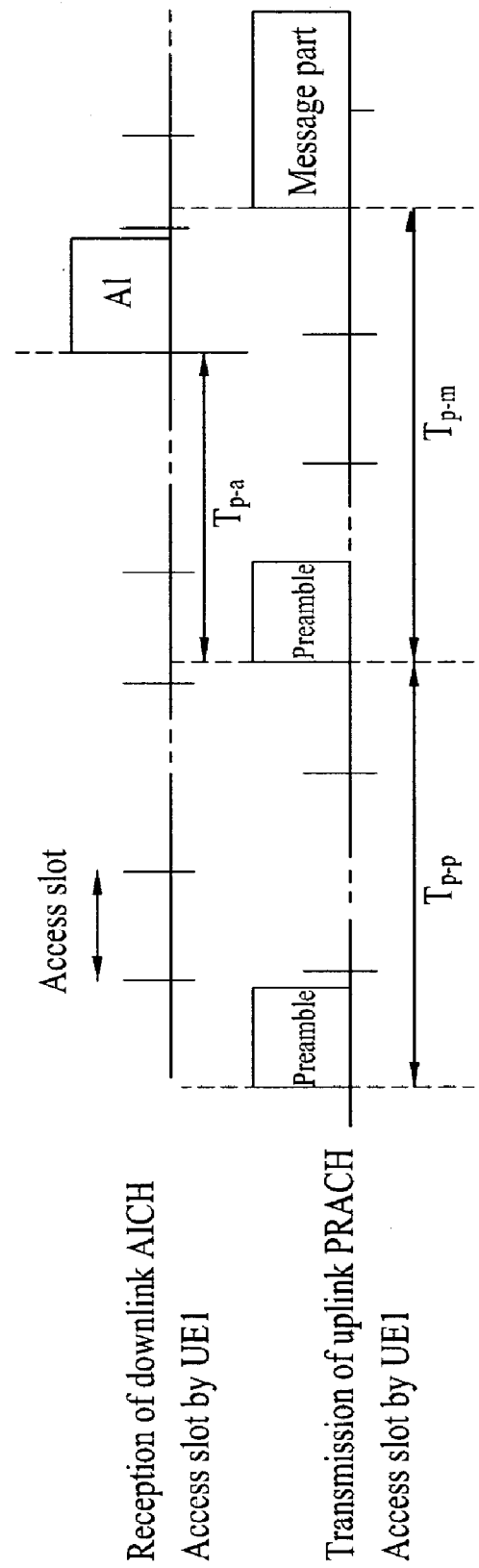
FIG. 8 illustrates the timing of the preamble, Access Indicator and message part.
Figure 9:
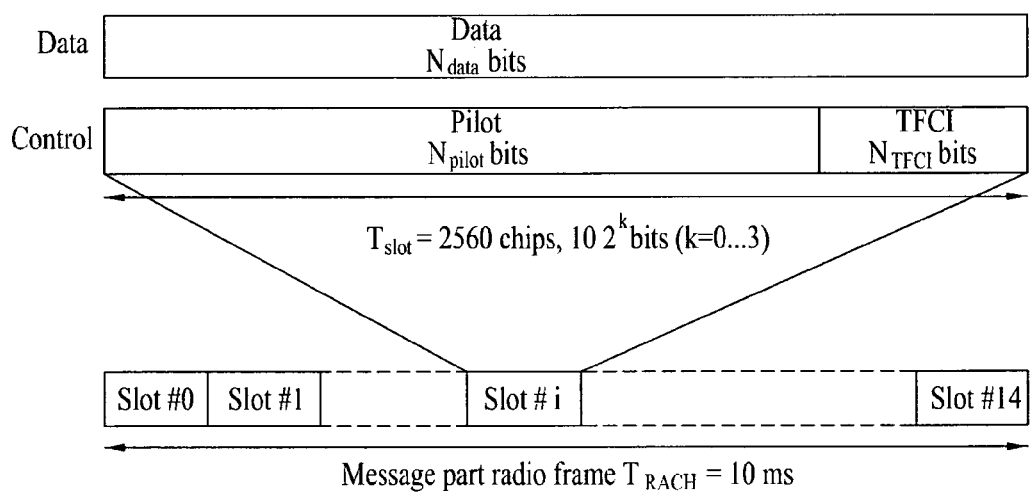
FIG. 9 illustrates the structure of the random access message part.
Figure 10:
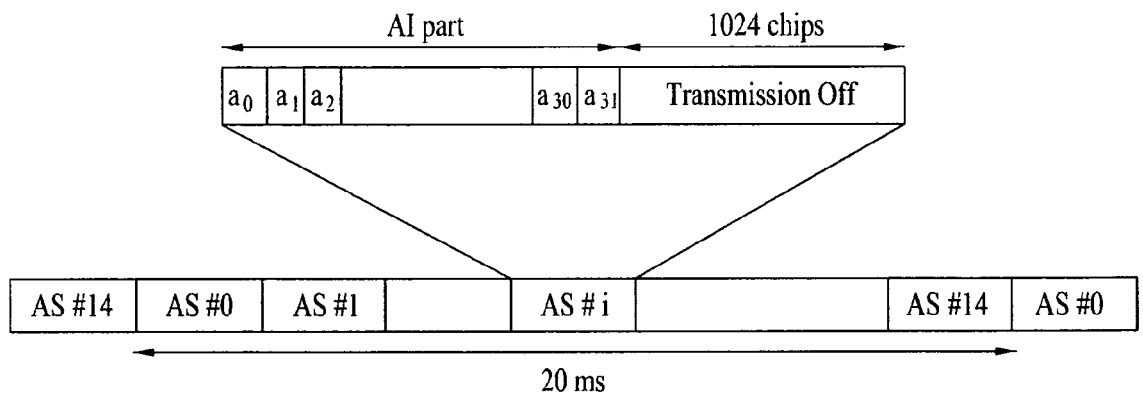
FIG. 10 illustrates the structure of the AICH.
Figure 11:
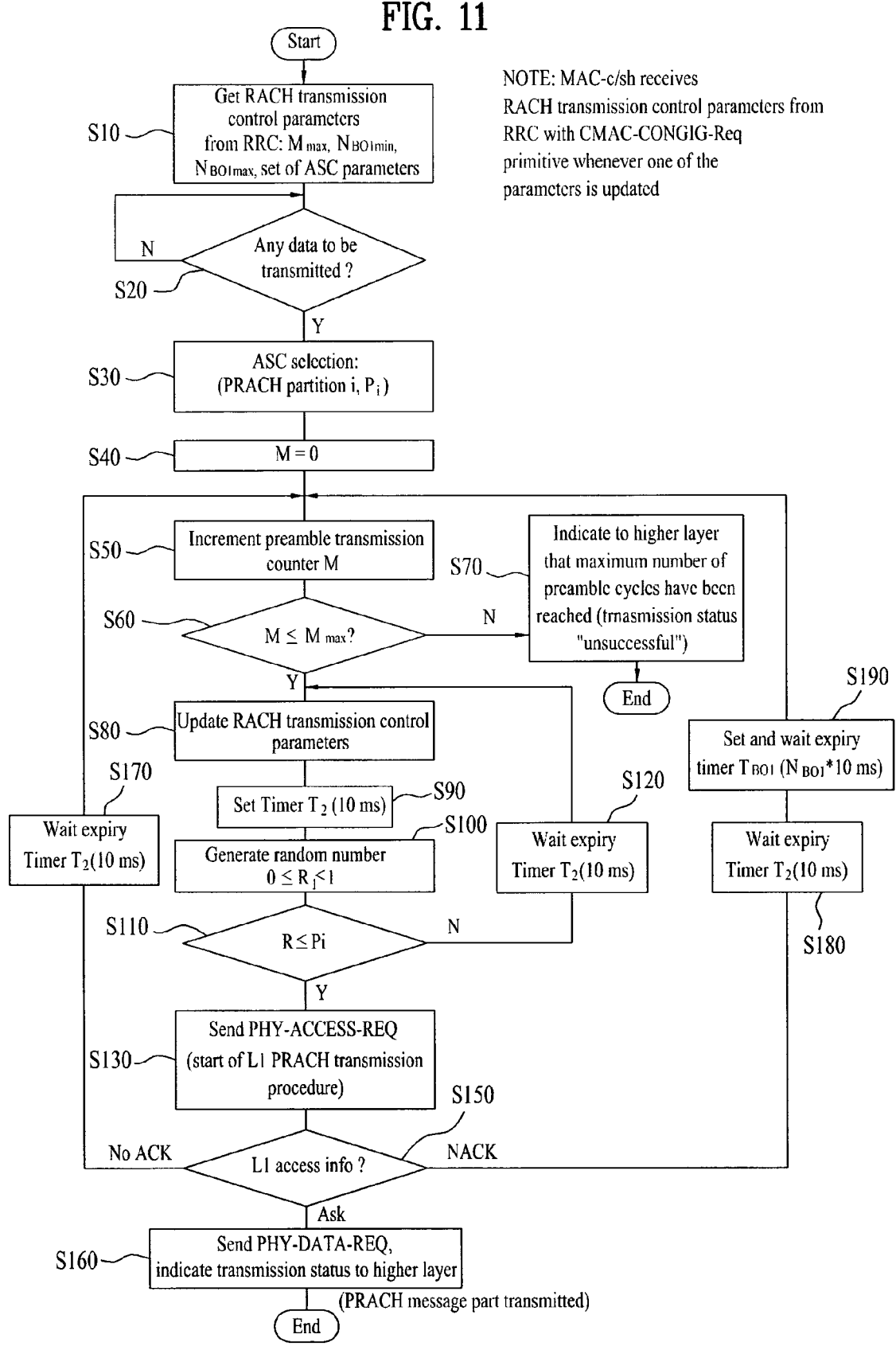
FIG. 11 illustrates a control access procedure.
Figure 12:
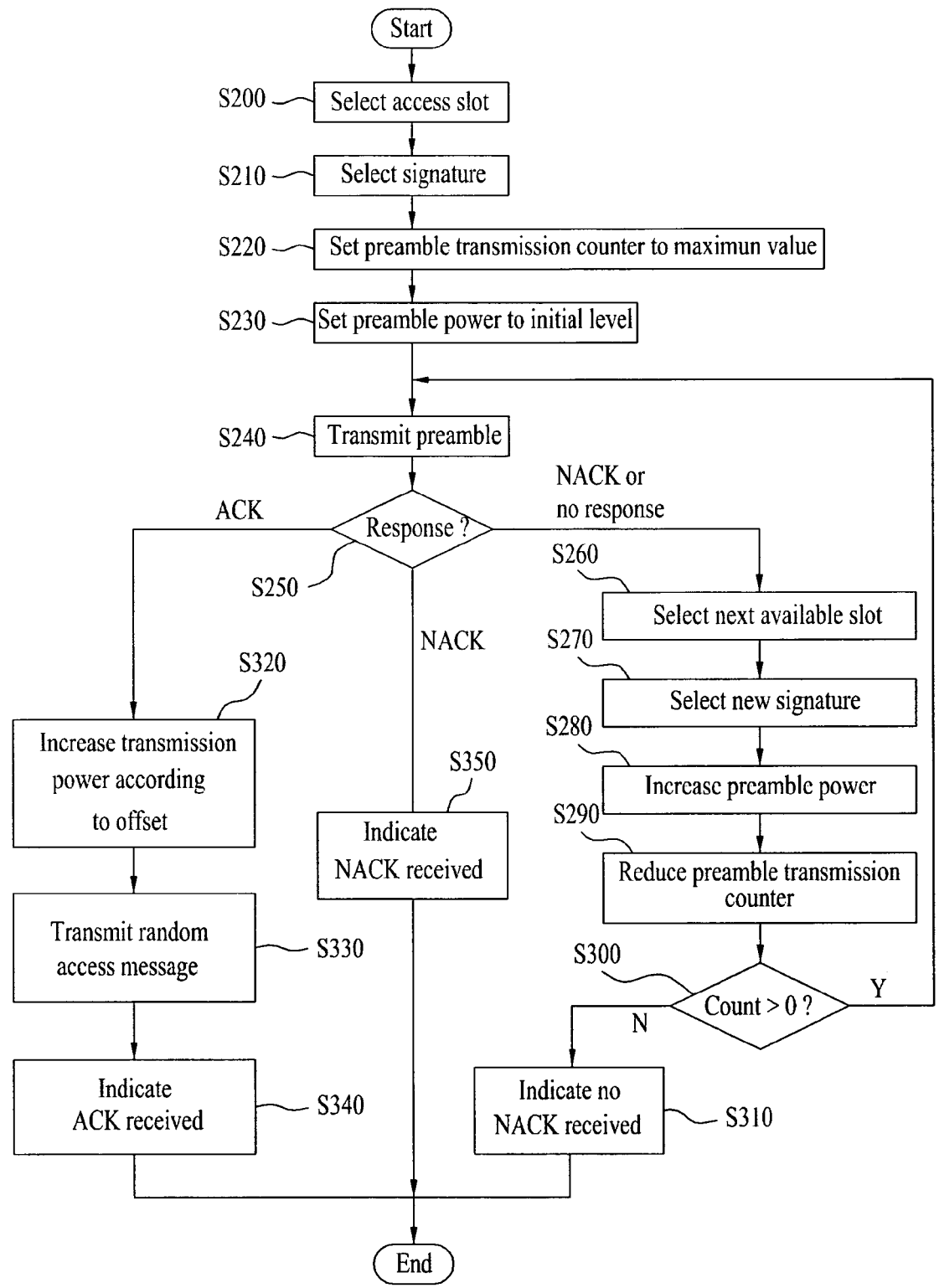
FIG. 12 illustrates a physical layer random-access procedure
Figure 13:
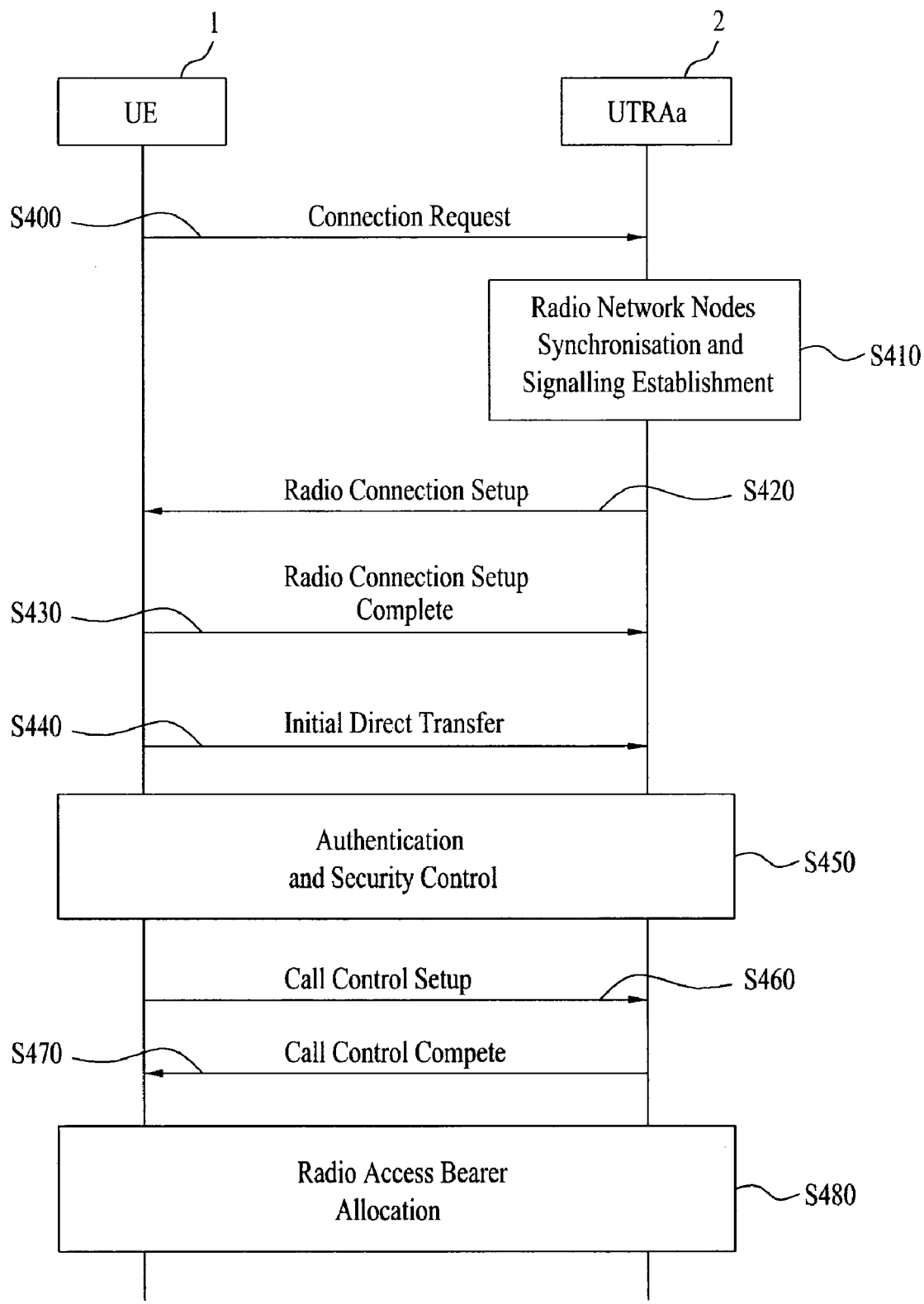
FIG. 13 illustrates a signaling establishment procedure between a UE and network.
Figure 14:
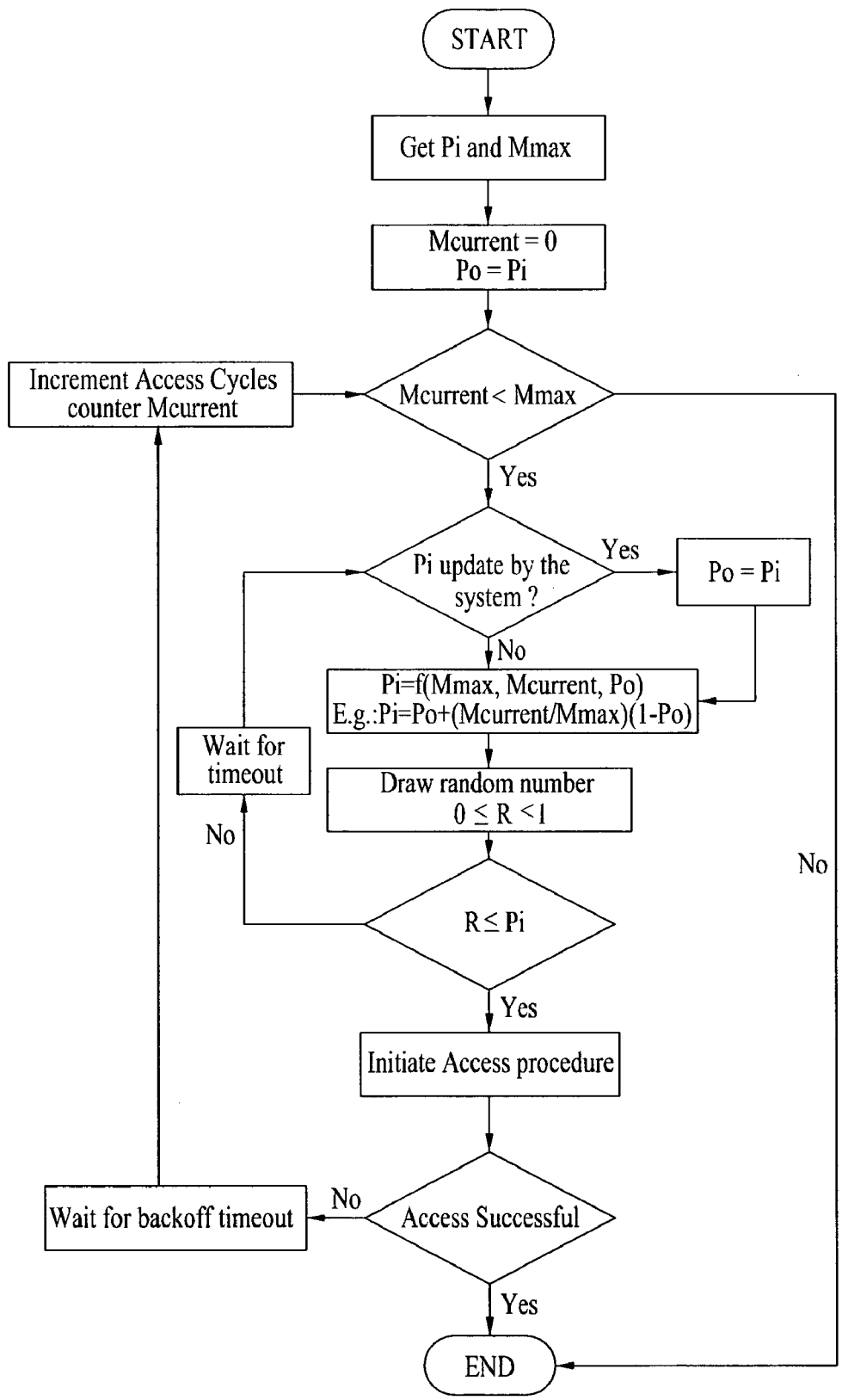
FIG. 14 illustrates an example for increasing the probability value according to one embodiment of the present invention.

Different algorithms may be utilized to determine the $P_i$ step increase between access cycles. One example for increasing the $P_i$ step is illustrated in FIG. 14 and relates to a need for service differentiation, such as between delay-sensitive applications or real-time services and delay-tolerant applications or non real-time services, whereby each priority class may be assigned a different persistence value $P_i$ and different step increase for retransmission cycles. The class with higher priority will have a bigger step increase such that the last access cycles would have immediate transmission, by setting $P_i = 1$. The following formula may be applied:

$$P_i = P_0 + (M_{current}/M_{max})(1 - P_0),$$

where $P_0$ initial or updated value of $P_i$ set by the UTRAN 2.

Figure 15:
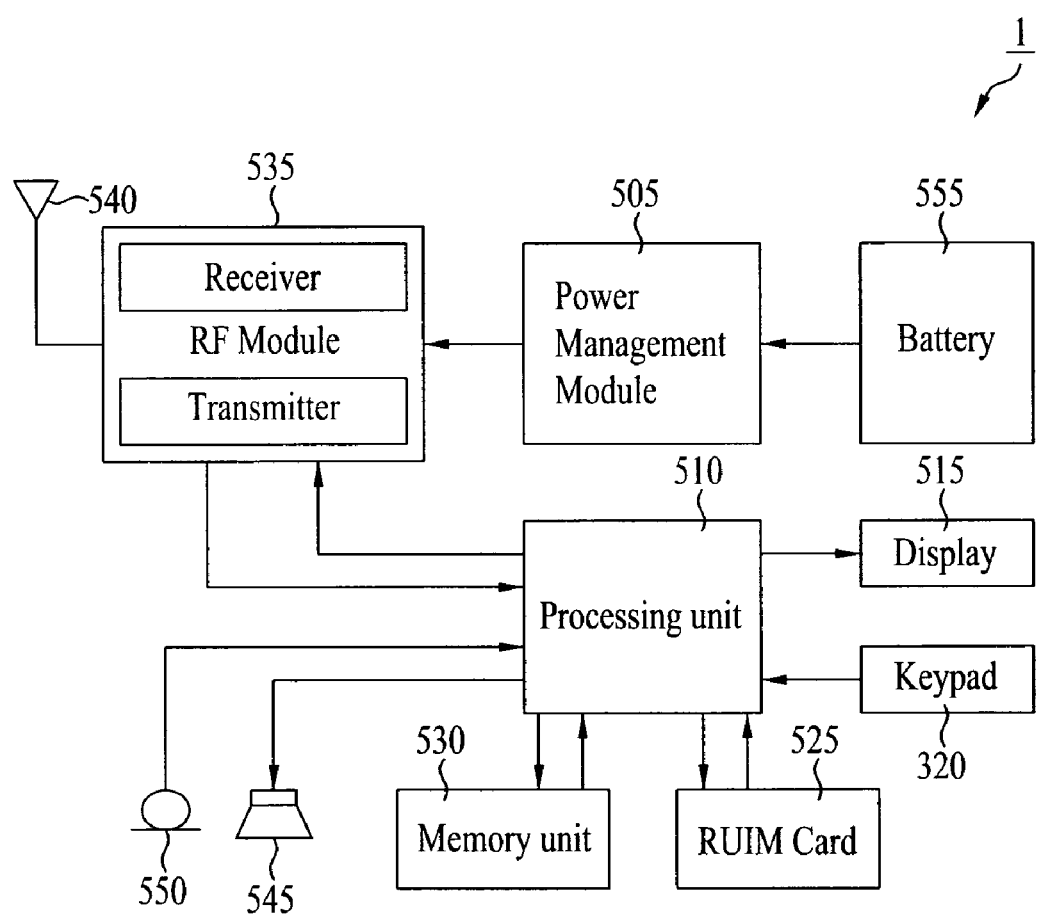
FIG. 15 illustrates a block diagram of a mobile station (MS) or access terminal (AT) according to the present invention.

FIG. 15 illustrates a block diagram of a mobile station (MS) or UE 2. The AT 2 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method of establishing a communication link between a mobile terminal and a network, the method comprising:
   determining that access to the network is required; and successively transmitting an access request to the network until access is granted or a predetermined criteria occurs, wherein the time at which each access request is transmitted is dependent upon a numeric random delay process performed at the mobile terminal, wherein the random delay process determines a random delay, the random delay process being altered for each access request subsequent to transmission of the first access request such that the probability of a smaller random delay is increased.

2. The method of claim 1, wherein the predetermined criteria is reached when a maximum number of access requests is transmitted.

3. The method of claim 1, further comprising comparing a first value to a second value.

4. The method of claim 3, wherein comparing the first value to the second value comprises:
assigning an initial first value to the mobile terminal; and
randomly generating the second value.

5. The method of claim 4, wherein the assigned value is changed by a greater amount before each subsequent access request.

6. The method of claim 4, wherein the comparison process is altered such that the range of possible randomly generated second numbers is restricted.

7. The method of claim 6, wherein either an upper limit of the range is decreased or a lower limit of the range is increased before each subsequent access request.

8. The method of claim 3, wherein the random delay process is altered such that the first value is either increased or decreased.

9. The method of claim 3, wherein the random access request is transmitted if the second value is not greater than the first value.

10. The method of claim 9, wherein the comparison process is altered such that the first value is decreased.

11. The method of claim 9, wherein the comparison process is altered such that the range of randomly generated second numbers is restricted to a range having an upper limit.

12. The method of claim 11, wherein the upper limit is decreased by a greater amount before each subsequent access request.

13. The method of claim 3, wherein the first value is decreased by a greater amount before each subsequent access request.

14. The method of claim 1, further comprising altering the random delay process according to a priority class of the mobile terminal.

15. The method of claim 14, wherein the priority class is related to an access class of the mobile terminal.

16. The method of claim 14, wherein the priority class is related to a reason for accessing the network.

17. The method of claim 14, further comprising altering the random delay process such that transmission is guaranteed for the mobile terminal if the next subsequent transmission of an access request will result in the criteria occurring.

18. A mobile terminal for establishing a communication link between a mobile terminal and a network, the mobile terminal comprising:
a transmitting/receiving unit transmitting an access request to the network;
a display unit displaying user interface information;
an input unit receiving inputs from a user; and
a processing unit controlling the transmitting/receiving unit to successively transmit an access request to the network until access is granted or a predetermined criteria occurs, wherein the processing unit identifies a time at which each access request is transmitted by determining a random delay according to a numeric random delay process, the random delay process being altered for each access request subsequent to transmission of the first access request such that the probability of a smaller random delay is increased.

19. The mobile terminal of claim 18, wherein the predetermined criteria is reached when a maximum number of access requests is transmitted.

20. The mobile terminal of claim 18, wherein the processing unit identifies the time at which each access request is transmitted by comparing a first value to a second value.

21. The mobile terminal of claim 20, wherein the processing unit compares the first value to the second value by:
assigning an initial first value to the mobile terminal; and
randomly generating the second value.

22. The mobile terminal of claim 21, wherein the processing unit changes the assigned value by a greater amount before each subsequent access request.

23. The mobile terminal of claim 21, wherein the processing unit alters the comparison such that the range of possible randomly generated second numbers is restricted.

24. The mobile terminal of claim 23, wherein the processing unit either decreases an upper limit of the range or increases a lower limit of the range before each subsequent access request.

25. The mobile terminal of claim 20, wherein the processing unit alters the random delay process such that the first value is either increased or decreased.

26. The mobile terminal of claim 20, wherein the control unit controls the transmitting/receiving unit to transmit the access request if the second value is not greater than the first value.

27. The mobile terminal of claim 26, wherein the processing unit alters the random delay process such that the first value is decreased.

28. The mobile terminal of claim 26, wherein the processing unit alters the random delay process such that the range of randomly generated second numbers is restricted to a range having an upper limit.

29. The mobile terminal of claim 28, wherein the processing unit decreases the upper limit by a greater amount before each subsequent access request.

30. The mobile terminal of claim 20, wherein the processing unit decreases the first value by a greater amount before each subsequent access request.

31. The mobile terminal of claim 18, wherein the processing unit alters the random delay process according to a priority class of the mobile terminal.

32. The mobile terminal of claim 31, wherein the priority class is related to an access class of the mobile terminal.

33. The mobile terminal of claim 31, wherein the priority class is related to a reason for accessing the network.

34. The mobile terminal of claim 31, wherein the processing unit alters the random delay process such that transmission is guaranteed for the mobile terminal if the next subsequent transmission of an access request will result in the criteria occurring.

* * * * *